United States Patent Office 3,265,752
Patented August 9, 1966

3,265,752
INHIBITING POPCORN POLYMER FORMATION
Alfred Case Whiton, Blue Bell, and Harry Elmer Albert, Lafayette Hill, Pa., assignors to Pennsalt Chemicals Corporation, Philadelphia, Pa., a corporation of Pennsylvania
No Drawing. Filed Dec. 17, 1964, Ser. No. 419,224
3 Claims. (Cl. 260—666.5)

This invention relates to the inhibition of the undesirable polymerization of olefinic monomers which give rise to popcorn polymers. The invention is particularly concerned with the use of a mixture of N-hydroxymorpholine with an N,N-dialkylhydroxylamine as a popcorn polymer inhibitor in processes relating to the preparation of synthetic rubber.

U.S. 3,148,225 which issued September 8, 1964, discloses the use of N,N-dialkylhydroxylamines as popcorn polymer inhibitors. It has now been found, however, that N-hydroxymorpholine may be used in conjunction with N,N-dialkylhydroxylamines to inhibit popcorn polymer formation with an effectiveness not heretofore obtained. We have found that the combination of N-hydroxymorpholine with the N,N-dialkylhydroxylamines is synergistic in action to produce an extremely efficient popcorn polymer inhibition system.

Thus, in accord with the invention, the formation of popcorn polymers in olefin monomer recovery systems is inhibited by the process of contacting said monomer with an inhibiting amount of a synergistic mixture comprising N-hydroxymorpholine and an N,N-di-lower-alkylhydroxylamine having the structure

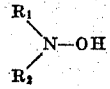

where $R_1$ and $R_2$ are alkyl groups containing from 1 to 6 carbon atoms in each of said alkyl groups. The term "alkyl" is meant to include cycloalkyl as well as acyclic alkyl and thus $R_1$ and $R_2$ will include methyl, ethyl, propyl, isopropyl, butyl, sec-butyl, tert-butyl, amyl, hexyl, cyclohexyl and the like. It will also be understood that $R_1$ and $R_2$ may be the same or different in the same molecule of N,N-di-alkylhydroxylamine.

The general conditions under which the olefin monomers are contacted with the inhibitors in accord with this invention will be those procedures set forth in U.S. 3,148,225 referred to above. Likewise, the olefin monomer recovery systems which are subject to the treatment in accordance with this invention will be those systems where polymers and copolymers are obtained from ethylenically unsaturated monomers, and will include those systems described in U.S. 3,148,225.

Preferably, the invention will be used to prevent popcorn polymer formation in butadiene based systems such as styrene-butadiene systems used for the manufacture of synthetic rubber and the invention will be illustrated by examples referring to this system. The concentration at which the inhibitor mixture will be used will usually range from 0.001 to about 5.0% of total inhibitors by weight of the total monomers; i.e. from about 10 to 50,000 parts per million parts of monomer. At concentrations below this value the inhibiting effects are too small to be of significant value. On the other hand, greater amounts may be used say up to 20% but such large amounts are not required and are simply wasteful.

The N-hydroxymorpholine will be used in conjunction with the N,N-dialkylhydroxylamine as described above at a weight ratio of N-hydroxymorpholine to N,N-dialkyl-hydroxylamine of from about 10:90 to about 90:10. Preferably, however the weight ratios at which the agents will be used will vary between 25:75 and 75:25.

As will be seen from the examples which follow, the use of a mixture of N-hydroxymorpholine and the N,N-dialkylhydroxylamine produces results which indicate that the combination is synergistic in its action, i.e. the use of the combination gives a result which significantly exceeds the additive effects resulting from the use of each of the individual components.

In order to further illustrate the invention the following example is given:

EXAMPLE 1

The procedure for evaluating the effectiveness of the popcorn polymer inhibitors of this invention is similar to that disclosed in U.S. 3,148,225 except that the popcorn polymer seed is activated prior to introduction into the atmosphere where popcorn polymer formation can occur. This activation is carried out by exposing the popcorn polymer seed to a 100 watt incandescent lamp for about 12 hours prior to its introduction into the polymerization atmosphere.

The technique in detail is as follows:

Bottles are flushed with nitrogen and then charged with 30 milliliters of inhibitor free styrene, 0.5 g. of popcorn polymer "seed" and the material to be tested as the popcorn inhibitor. The "seed" is that taken from a styrene-butadiene rubber flash tank and it is activated just before use by exposing it overnight to a 100 watt incandescent lamp. The bottles are then capped and 1 milliliter of butadiene is injected into each bottle with a hypodermic syringe through a self sealing synthetic rubber cap liner. The bottles are then placed in a constant temperature oven at 140° F. and are inspected periodically for the appearance of popcorn polymer. After popcorn growth starts in each bottle it usually proceeds rapidly, filling the free space in the bottle nearly full within hours with a white insoluble polymer having the appearance of popcorn. The following table indicates the test conditions and the results obtained:

Table I
EFFECT OF POPCORN POLYMER INHIBITORS EVALUATED AT 140° F.

| Inhibitor (percent by weight of total monomers): | Time required to observe popping |
|---|---|
| None, hours | 12 |
| 0.05% diethylhydroxylamine, days | 1.5 |
| 0.10% diethylhydroxylamine, days | 2.5 |
| 0.05% N-hydroxymorpholine, days | 11 |
| 0.05% N-hydroxymorpholine plus 0.05% diethylhydroxylamine, days | 16 |

It will be observed from a study of the above table that the combination of diethylhydroxylamine and N-hydroxymorpholine inhibits popcorn polymer formation for 16 days while the data would indicate that such a combination should give an additive effect of 12.5 days. Thus, the synergistic combination is obvious.

Instead of using N,N-diethylhydroxylamine in the above examples, N,N-dimethylhydroxylamine, N,N-diisopropylhydroxylamine, N,N-dihexylhydroxylamine, N-ethyl-N-t-butylhydroxylamine and N,N-dicyclohexylhydroxylamine are used in combination with N-hydroxymorpholine to give similar results.

It will be understood that numerous changes and variations may be made from the above description of the invention and the examples without departing from the spirit and scope of the invention.

We claim:
1. The process of inhibiting popcorn polymer formation in olefin monomer recovery systems which comprises contacting said monomer with an inhibiting amount of a mixture comprising N-hydroxymorpholine and an N,N- dialkylhydroxylamine containing from one to six carbon atoms in each alkyl group.

2. The process of inhibiting popcorn polymer formation from monomers used in the preparation of a butadiene based elastomer which comprises contacting said monomers with about 0.001% to about 5% by weight of said monomers with a mixture comprising N-hydroxymorpholine and an N,N-dialkylhydroxylamine containing from one to six carbon atoms in each alkyl group, said N-hydroxymorpholine and said N,N-dialkylhydroxylamine being at a weight ratio from 10:90 to 90:10.

3. The process of inhibiting popcorn polymer formation from monomers used in the preparation of a styrene-butadiene elastomer which comprises contacting said monomers with an inhibiting amount of a mixture comprising N-hydroxymorpholine and N,N-diethylhydroxylamine, said N-hydroxymorpholine and N,N-diethylhydroxylamine being at a weight ratio of from 25:75 to 75:25.

References Cited by the Examiner
UNITED STATES PATENTS
3,148,225  9/1964  Albert _____ 260—666.5 X DELBERT E. GANTZ, *Primary Examiner.*

G. E. SCHMITKONS, *Assistant Examiner.*